US010489121B2

(12) United States Patent
Choudhari

(10) Patent No.: US 10,489,121 B2
(45) Date of Patent: Nov. 26, 2019

(54) METHOD AND APPARATUS FOR DETERMINING SYSTEM INFORMATION IN A DEVICE HAVING A PLURALITY OF PROCESSORS, EACH INCLUDING VIRTUAL MACHINES AND SOME LOCATED ON SEPARATE INSERTABLE BOARDS

(71) Applicant: AVAGO TECHNOLOGIES INTERNATIONAL SALES PTE. LIMITED, Singapore (SG)

(72) Inventor: Niren Choudhari, Milpitas, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 69 days.

(21) Appl. No.: 15/605,580

(22) Filed: May 25, 2017

(65) Prior Publication Data

US 2017/0351558 A1 Dec. 7, 2017

Related U.S. Application Data

(60) Provisional application No. 62/344,841, filed on Jun. 2, 2016.

(51) Int. Cl.
*G06F 9/455* (2018.01)
*G06F 8/30* (2018.01)

(52) U.S. Cl.
CPC .............. *G06F 8/31* (2013.01); *G06F 9/4555* (2013.01); *G06F 9/45558* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 2007/0067366 A1* | 3/2007 | Landis | G06F 12/109 |
| 2010/0318990 A1* | 12/2010 | Hou | G06F 9/45533 |
| | | | 718/1 |
| 2010/0325277 A1* | 12/2010 | Muthiah | G06F 9/50 |
| | | | 709/226 |
| 2012/0226804 A1* | 9/2012 | Raja | H04L 43/028 |
| | | | 709/224 |

* cited by examiner

*Primary Examiner* — Shih-Wei Kraft
(74) *Attorney, Agent, or Firm* — Xsensus, LLP

(57) ABSTRACT

A framework that creates an abstraction layer to configure/display system resources and process/application resource utilization while accessing the system information from a CLI. The framework is implemented using a scripting language like python and uses pre-existing OS or OEM tools to configure/display system resource information and filter the output to implement the CLI. A user argument defines the choice to use the framework as a standalone utility (running in a Linux shell) or in a library mode. Since the framework makes use of OS or OEM tools and does not access any system resource directly, the framework can be run in the virtual machine and baremetal OS. The framework can access the OS or OEM tools to configure/display system resource information locally and remotely by establishing remote communication through rsh (remote shell) connections. This approach allows reuse of the code, minimizes the implementation complexity, reduces development time and minimizes defects.

10 Claims, 4 Drawing Sheets

METHOD AND APPARATUS FOR DETERMINING SYSTEM INFORMATION IN A DEVICE HAVING A PLURALITY OF PROCESSORS, EACH INCLUDING VIRTUAL MACHINES AND SOME LOCATED ON SEPARATE INSERTABLE BOARDS

CROSS REFERENCE TO RELATED APPLICATIONS

This application claims the benefit under 35 U.S.C. § 119(e) of U.S. Provisional patent application Ser. No. 62/344,841, entitled "Method and Apparatus for Determining System Information in a Device Having a Plurality of Processors, each Including Virtual Machines and some Located on Separate Insertable Boards," filed Jun. 2, 2106, which is hereby incorporated by reference.

REFERENCE TO A COMPUTER PROGRAM LISTING APPENDIX

The application includes a computer program listing appendix submitted as an ASCII text file, entitled "cpuifinfo.txt," dated Jun. 2, 2016 and 44 kB long, which is hereby incorporated by reference as if reproduced in its entirety.

BACKGROUND OF THE INVENTION

1. Field of the Invention

The invention relates to network switches and routers.

2. Description of the Related Art

Sometimes collecting hardware interface (scattered) statistics is not straightforward, especially in a kernel-based virtual machine (KVM) environment. For example in a KVM environment, the HOST OS (operating system) has access to the physical network interface, while the Guest OS (GOS) has access to the virtual network interface. To collect the complete network interface statistics it is necessary to collect both physical and virtual interface statistics to validate the interface. One more challenge is that from the GOS it is not possible to directly access the HOST OS interface device, so a legacy approach of using the same information device driver by just opening the device and get the statistics using ioctl( ) calls (C language) cannot be used.

Systems standalone utilities that have been implemented to configure/display the device details also need to be supported with a network operating system (NOS) command line interface (CLI). To support the same functionality with the NOS CLI code, changes are involved in implementing clispec, which is used to capture details of the command syntax and re-implementing the same configure/display of the device functionality to populate the managed object (MO) that represents the particular device in a distributed configuration management (DCM) backend so that a statistics output can be displayed with the NOS CLI statistics command, with RestAPIs (Representational state transfer application programming interfaces) or with a Netconf (Network Configuration Protocol) tool.

Due to this requirement, it would be necessary to re-implement the same code in two locations, which makes enhancements difficult and takes more time to support non-critical functionalities. So an option is needed that can satisfy a standalone utility (Linux shell utilities) requirement and can be used as a library to provide outputs and values if called from Application DCM backend.

SUMMARY OF THE INVENTION

A SysResource Framework according to the present invention creates an abstraction layer to configure/display system resources like network, HDD, Flash, RAM, CPU, OS resources utilization, various firmware versions (like sysfpga, ioG NVRAM, SW release version), and process/application resource utilization while accessing the system information from the NOS CLI.

This makes it an easy option to implement a configure/display system resource utilization tool instead of access device interface or /proc/file system (with open( ) ioctl( ) or read( ) or write( ) calls using legacy C language). It allows the use of existing OS tools (ifconfig, ethtool, top, ps, ulimit, du, df . . . ) and OEM custom utilities like fpga. Since these tools and utilities are implemented in C language and already accessing the OS or resource interface to collect the same info, it is then possible to make use of the configuration or output supported by these tools and utilities and filter out only the required output as needed to be displayed.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Figure 1:
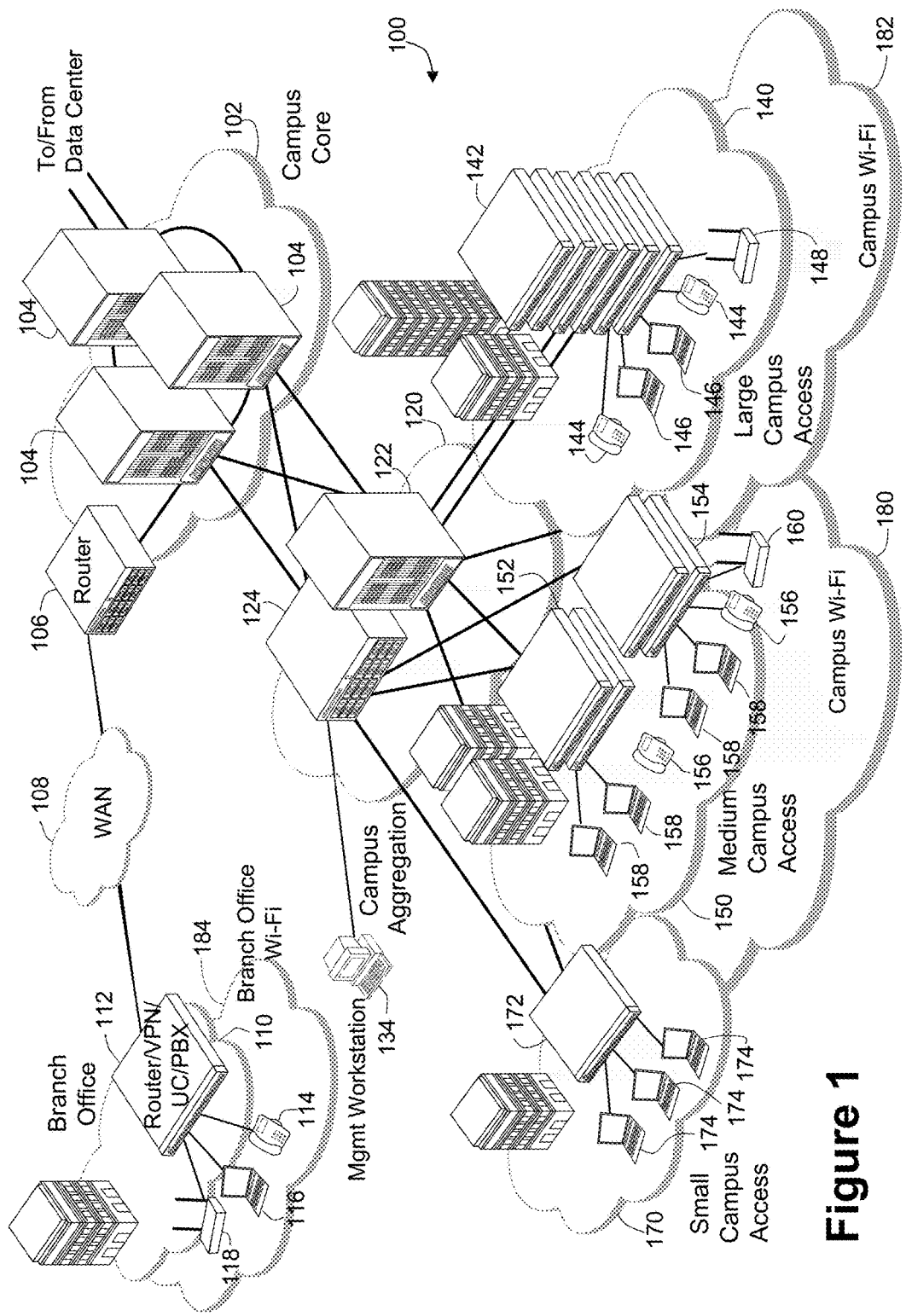
FIG. 1 is a block diagram of an enterprise network.

FIG. 1 illustrates a general network architecture 100 for an enterprise with branch offices and various campuses. A campus core network 102 includes a plurality of interconnected core switches 104. The core switches 104 are connected to a data center (not shown). A router 106 is connected to the core switches 104. The router 106 connects through a wide area network (WAN) 108 to a branch office network no. The branch office network no includes a unified device 112, which operates as a router, virtual private network interface, unified communication interface, switch and PBX. Therefore, telephones 114, computers 116 and wireless access points 118, with associated branch office Wi-Fi® area 184, are connected to the unified device 112. A campus aggregation network 120 is connected to the campus core network 102. The campus aggregation network 120 includes switches 122 and 124. The switches 122 and 124 are connected to the core network switches 104. Connected to the switch 124 in FIG. 1 is a management workstation device 134 used by a network administrator to manage the network 100. A large campus access network 140 includes a series of stackable switches 142, which are connected to the switches 122 and 124. Connected to the stackable switches 142 are telephones 144, computers 146 and wireless access points 148, with associated campus Wi Fi® area 182. A medium campus access network 150 includes a series of switches 152 and 154, which are connected to the switches 122 and 124. Connected to the switches 152 and 154 are telephones 156, computers 158 and wireless access points 160, with associated campus Wi-Fi® area 180. A small campus access network 170 includes a switch 172, which is connected to the switches 122 and 124. Connected to the switch 172 are computers 174.

In chassis-based system (core network switches 104, switches 122, 124) or a pizza box (any standalone system such as switches 152, 154, 172), there is always the need to configure or collect various system resource information. A list of a few of system resources are:

Network interface
Storage: HDD, Flash
SDRAM, CPU
OS resources utilization
Firmware version used (like sysfpga, ioG NVRAM, SW release version)
Process/App resource utilization (Heap/stack/threads/CPU/ . . . )
Chassis LC (line card) slots power ON/OFF control through FPGA To implement a custom utility to configure/display system resource utilization requires accessing the device interface with open( ) of the device or file, followed by a few ioctl( ) calls or accessing /proc/* files using legacy C language. This overall implementation process is slow and needs to collect all system resource information, implement it and compile it to make a final custom tool. Then this custom tool can be used only as a standalone tool and cannot be used as a library tool to configure/display system resource utilization when invoked from a DCM backend (NOS CLI).

System Resource (SysResource) Framework Overview

To address various use cases and to speed up the development time of the configure/display of system resource utilization, a system resource framework according to the present invention is preferably used. Design points of this framework are:

Implement the custom utility only using a scripting language like python or bash.

Use pre-existing OS or OEM tools to configure/display system resource information and filter the output to implement the CLI. That avoids re-implementing the same code and is code independent of the platform and CPU architecture.

Since the utility is implemented in a scripting language, there is no need to spend time in code compilation and it is easy to debug using a scripting debugging tool on the target.

A utility user argument defines the choice to use the utility as a standalone utility (running in a Linux shell) or in a library mode. In standalone mode, the CLI output is displayed in a formatted output. When the utility is used in a library mode, it is invoked from a process/application DCM backend context and the output is redirected to the process using a pipe channel. The redirected output can be a raw string output, a key:value pair output or a JSON (JavaScript Object Notation) format.

Once the application receives the redirected output, the application just needs to parse the data and populate any Managed object elements, with translation of values to integer or float as necessary, and then assign it. Then this output can be displayed on the NOS CLI console or with RestAPIs or a Netconf tool.

Since the utility implementation makes use of OS or OEM tools and does not access any system resource directly, this utility can be run in the VM (virtual machine) and baremetal OS.

With this design approach, the utility can access the OS or OEM tool to configure/display system resource information, for example in a KVM (Kernel-based Virtual Machine) environment, locally and remotely on an OS contained on an LC or another management module (MM) by establishing remote communication through rsh (remote shell) connections and execute the utility. Therefore, the utility can access the OS or OEM tool for the following setup scenarios.

A. Standalone system (pizza box) GOS and/or HOST OS.
B. Chassis-based system:
MM card GOS and/or HOST OS.
LC card GOS and/or HOST OS.
Remote LC card GOS and/or HOST OS from MM card GOS and/or HOST OS.
Remote MM card GOS and/or HOST OS from LC card GOS and/or HOST OS.

In a chassis-based system, the same utilities and SysResource framework are preferably installed on all MM and LC cards so that the same configure/statistics can be accessible locally and from the remote card. By installing the framework and utilities on all cards and all OSs, it is easier to obtain the statistics as any OS can be used.

This approach creates an abstraction layer for the NOS CLI to configure/display system resource information by using utilities implemented with SysResource framework. This approach allows reuse of the code, minimizes the implementation complexity, reduces development time and minimizes defects.

Figure 2:
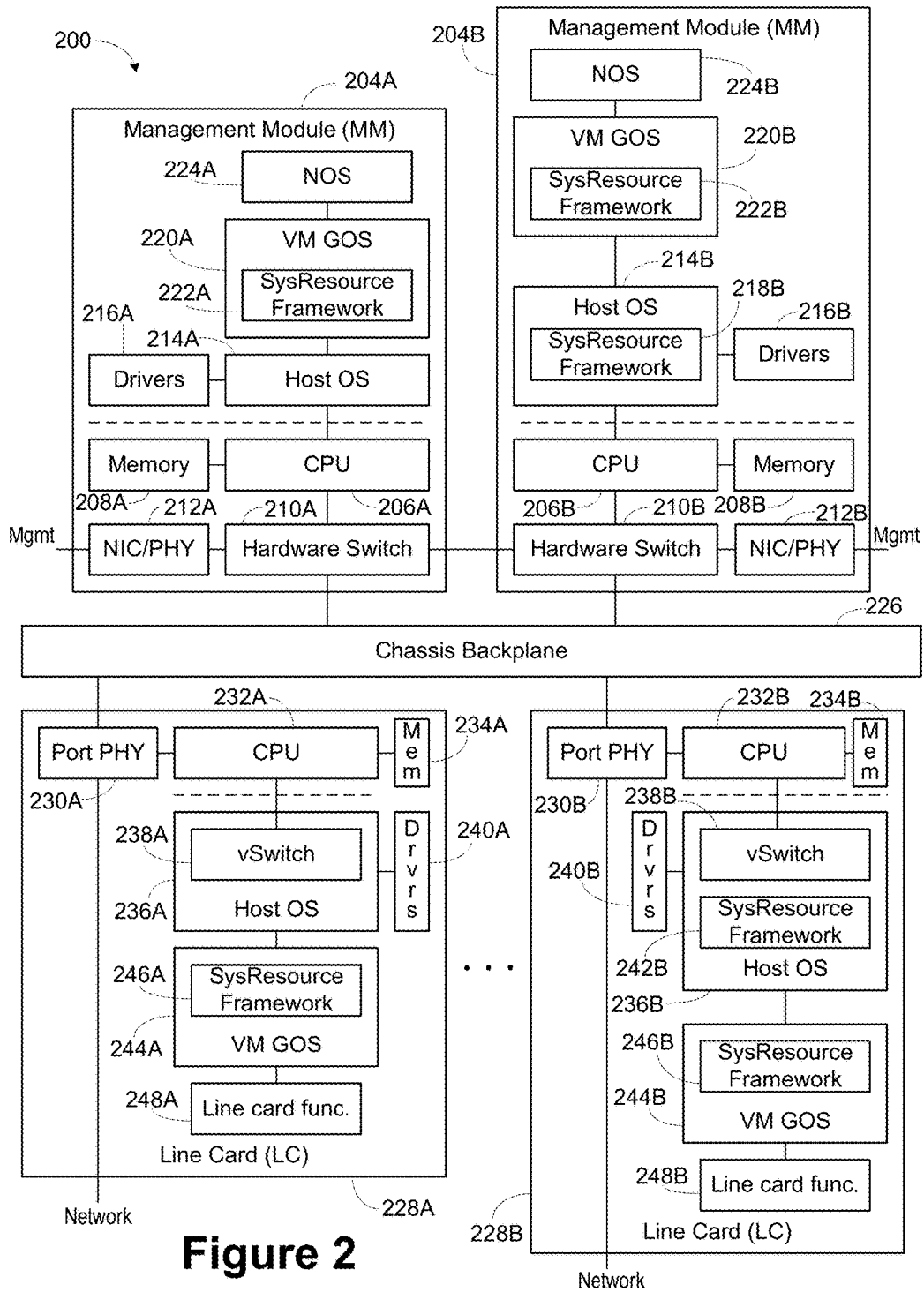
FIG. 2 is a block diagram of a chassis switch according to the present invention.

FIG. 2 is a block diagram of the hardware and software architecture of a chassis-based system 200. Management modules 204A, 204B are present to provide basic switching and control capabilities. A CPU 206A, 206B provides the basic processing capability and executes programs stored in a memory 208A, 208B. The CPU 206A, 206B is connected to a packet switch 210A, 210B, with the packet switch 210A, 210B performing the basic switching operation of the illustrated system 200. A network interface card (NIC) 212A, 212B and its PHY are connected to the packet switch 210A, 210B to provide management access to the system 200.

On the software side, a HOST OS 214A, 214B provides the basic operating system for the MM 204A, 204B. Drivers 216A, 216B are provided at the HOST OS 214A, 214B level to allow control and management of the hardware elements, particularly the switch 210A, 210B. A SysResource Framework instance 218B according to the present invention is present in the HOST OS 214B to allow operation according to the present invention. A VM GOS 220A, 220B is present executing on the HOST OS 214A, 214B. A SysResource Framework instance 222A, 222B is present in the VM GOS 220A, 220B. A NOS 224A, 224B is present and running on the VM GOS 220A, 220B to provide NOS services and control.

While the use of virtual machines is illustrated, it is understood that containers can be used instead as appropriate. For example, VM GOS 220A and NOS 224A could be formed as a container for the NOS and would include the SysResource Framework.

The management modules 204A, 204B are connected to a chassis backplane 226, which connects the various cards in the system 200 and provides power to the various cards. Line cards 228A, 228B are connected to the backplane 226. The line cards 228A, 228B provide the connectivity to the network. The line cards 228A, 228B can provide different interfaces to the network, such as different rates and number of ports of Ethernet, for example, depending on the design of the particular line card.

Each line card 228A, 228B includes a port PHY 230A, 230B which connects the external port to the chassis backplane 226. The port PHY 230A, 230B contains the hardware needed to process packets according to the particular network. For example, if the network is Ethernet, the port PHY 230A, 230B will include the packet processors and the routing tables and the like and the interface needed for the hardware switches 210A, 210B. Each line card 228A, 228B includes a CPU 232A, 232B and associated memory 234A, 234B. A host OS 236A, 236B is associated with each CPU 232A, 232B. A vswitch 238A, 238B is located in each host OS 236A, 236B to provide virtual switching for various VMs present on the line card 228A, 228B. Drivers 240A, 240B are provided to allow the CPU 232A, 232B to control the port PHY 230A, 230B. A SysResource Framework instance 242B according to the present invention is present in the host OS 236B to allow operation according to the present invention. A VM GOS 244A, 244B is present over the host OS 236A, 236B. A SysResource Framework instance 246A, 246B according to the present invention is present in the VM GOS 244B to allow operation according to the present invention. A line card function module 248A, 248B, executes in the VM GOS 244A, 244B to provide the basic line card operation and management.

Figure 3:
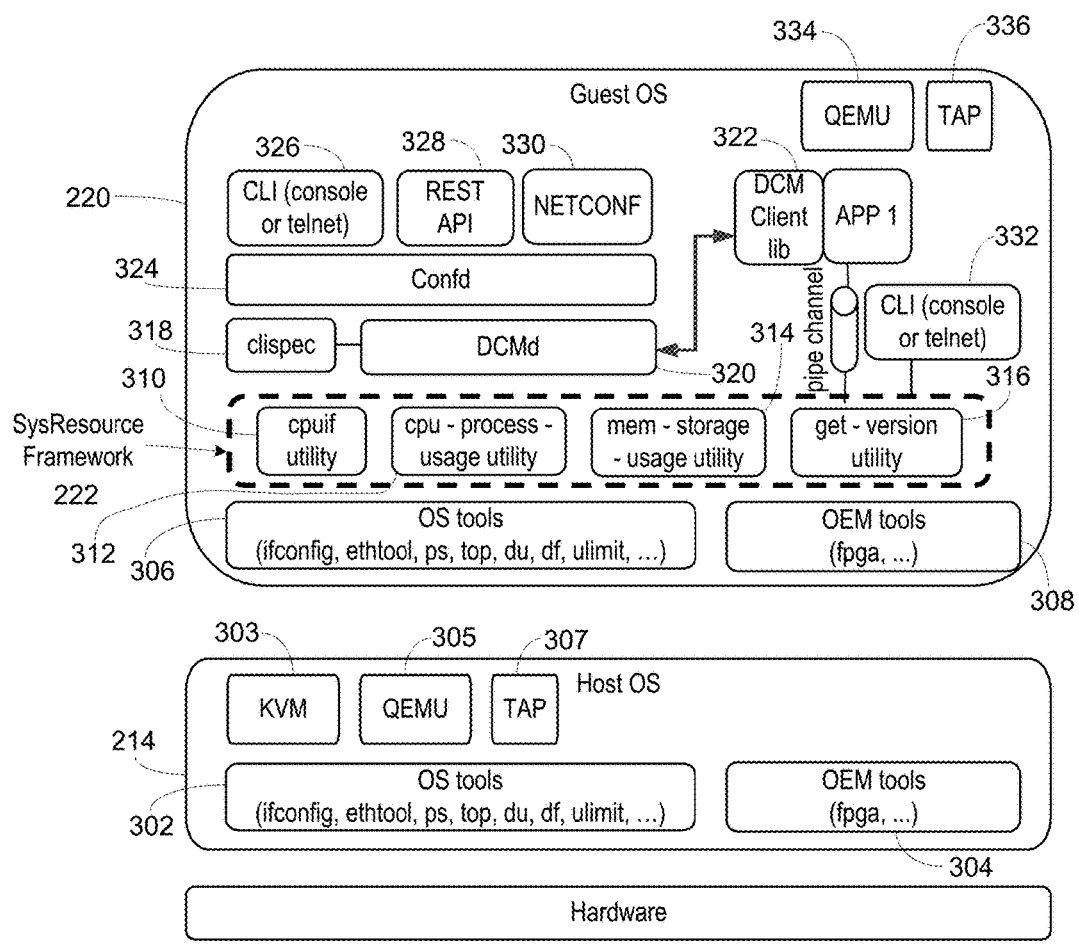
FIG. 3 is a block diagram detailing software modules present in the switch of FIG. 1.

FIG. 3 provides more details on the various modules present in the host OS 214 and the VM GOS 220. Preferably, the host OS 214 and the VM GOS 220 are Linux variants, allowing use of the many Linux tools available. The host OS 214 includes OS tools 302 and OEM tools 304. The OS tools 302 are functions such as ifconfig, ethtool, ps, top, du, df, ulimit, etc. that are normally present in Linux OSs. The OEM tools 304 are functions or modules developed by the system manufacturer, usually to work with the custom hardware present in the device, such as FPGAs (field-programmable gate arrays) or ASICs (application-specific integrated circuits). The host OS 214 further includes three modules to assist in its operations. A KVM (kernel-based virtual machine) module 303 is present to allow the preferred Linux kernel to operate as a hypervisor. A QEMU (Quick Emulator) module 305 is present to provide hardware virtualization, particularly of a network interface card (NIC). A tap interface 307 is present to work with the QEMU module 305 to provide a virtual interface to cooperate with the GOS 220 to allow packets to be transferred between the OSs.

The GOS 220 contains the same OS tools 306 and OEM tools 308 as the host OS 214, as these are basic tools for an OS. A SysResource Framework 222 is present in the GOS 220. The SysResource Framework 222 includes various utilities, as discussed below. The utilities include CPUIF 310, CPU-process-usage 312, memory-storage-usage 314 and get-version 316. CPUIF 310, CPU-process-usage 312 and memory-storage-usage 314 are discussed in more detail below, with source code for CPUIF 310 provided in the accompanying source code appendix. Get-version 316 obtains the firmware versions of the relevant firmware.

Various other modules are present in the GOS 220. A clispec module 318 is connected to a DCMd daemon 320 which provides the distributed configuration management services and is connected to a DCM Client Library 322, which interfaces with any applications, such as NOS 224 or line card function module 228. A confd module 324 is present to provide lightweight configuration management capabilities. A CLI module 326 provides the CLI interface for managing the device. A REST API module 328 provides the REST interface for managing the device. A NETCONF module 330 provides NETCONF services.

A second CLI module 332 is present and connected to the SysResource Framework 222 to provide direct CLI access to the SysResource Framework 222. A QEMU module 334 is present, as is a tap interface 336. The tap interface 336 works with the tap interface 307 to allow packets to be passed between the host OS 214 and the GOS 220. In the preferred embodiments, each OS includes a tap interface, so that any OS can communicate with any other OS, even in separate devices, assuming proper IP (Internet protocol) address setup and the like. An example communication is an rsh session.

Figure 4:
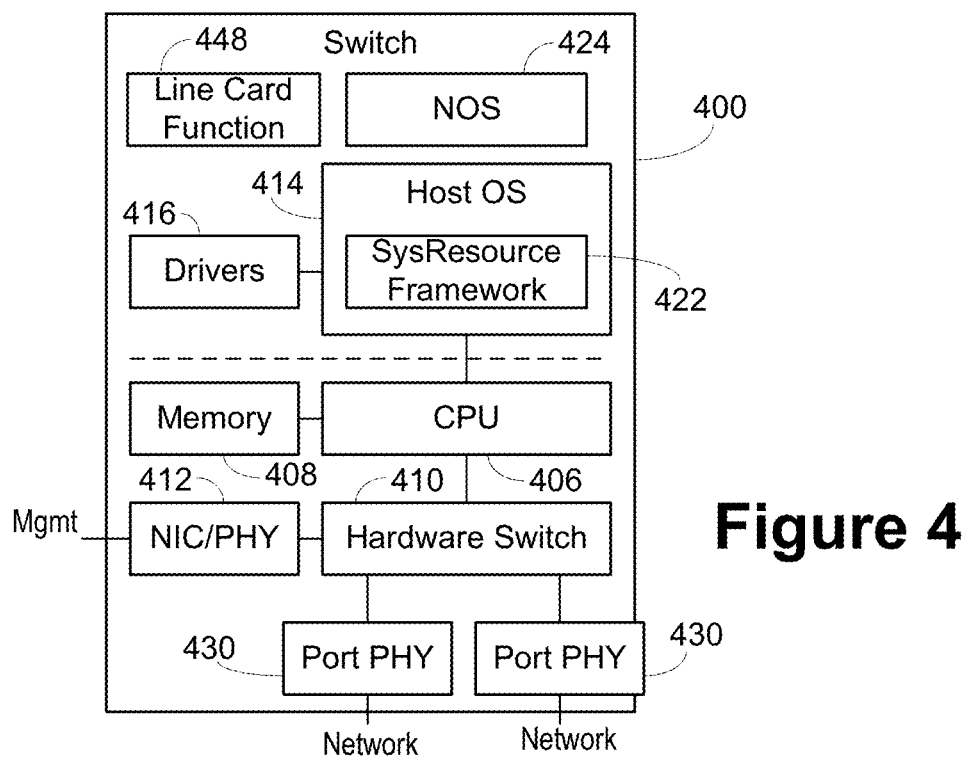
FIG. 4 is a block diagram of a pizza-box switch according to the present invention.

FIG. 4 is a block diagram of a pizza box switch 400, which has only a host OS 414 and no GOS, but the SysResource framework 422 and related utilities are still useful to simplify access to the statistics. A CPU 406 has associated memory 408. The CPU 406 is connected to a hardware packet switch 410. A NIC 412 is connected to the packet switch 410 to provide a management interface for the switch 400. Port PHYs 430 are connected to the packet switch 410 to interface to the network. The host OS 414 executes on the CPU 406. Drivers 416 are present to manage the packet switch 410 and the port PHYs 430. A NOS 424 and line card function 448 are present to provide the switch and network functionality.

With the above descriptions complete, operations and structure of the CPUIF 310, CPU-process-usage 312, memory-storage-usage 314 utilities will now be described by way of exemplary use cases.

SysResource Framework Use Case 1: (CPUIF Utility)

A CPUIF utility implementation to collect the KVM HOST and GOS network interface statistics is not straightforward to implement using a C library (legacy approach) and utility. Basing the CPUIF utility on the SysResource framework design allows the use of a Python script as it involves execution of multiple OS statistics tools (ifconfig and ethtool) and parsing of statistics output to get the final desired statistics output. An example Python script for a CPUIF utility is provided below.

To show these CPUIF statistics through the NOS CLI infrastructure, the CPUIF Python based standalone tool is used as library. This is achieved by adding an extra option (--noscli) in the tool to provide raw statistics string counter outputs so that it can be used as library. In the NOS CLI backend, the same tool is called with --noscli to use as a library and its output is redirected using a pipe channel to the application backend services. Once the application backend receives the raw statistics string counter outputs, it filters and converts the string to long format to populate any NOS CLI Managed objects (MO). The NOS CLI statistics command, RestAPIs or a Netconf tool can then display these statistics.

Syntax Examples

CPUIF statistics tool as standalone utility to display statistics
  # cpuif --showdetail --if backplane
  CPUIF statistics tool in library mode to redirect the raw statistics string counter output when invoked from the NOS CLI backend
  # cpuif --showdetail --if backplane -noscli
  A NOS CLI command to display CPUIF statistics collected from the backend through CPUIF tool in library mode
  > show cpu-interface statistics interface backplane
  Example to access local device system info of cpuif interface
  # cpuif --showdetail --if backplane
  Example to access remote device system info of cpuif interface
  # cpuif --remote<remote ip address>--showdetail --if backplane The keyword and argument "remote<remote ip address>" indicates the desire to execute the command on a remote OS present at the <remote ip address>. The SysResource Framework utilizes rsh to execute the "showdetail" command on the referenced OS. Telnet can be used instead of rsh with the provision of a username and password. If the command is to leave the closed environment of a given device or datacenter, use of ssh is preferred for security reasons.

The CPUIF command also provides an option to collect other MM/LC card backplane interface statistics by using an MM/LC slot option in the command. This command internally establishes remote connection with other MM/LC cards using rsh and then running the desired OEM or OS tool on other MM/LC slot OS to collect the statistics and display them. With this capability, from a single MM/LC card we can collect all chassis MM and LC cards statistics. In the most extreme case, only one instance of the SysResource framework and utilities, such as CPUIF, is needed. All of the other OSs can be reached using rsh as described above. This is illustrated in FIG. 2 by not having the SysResource framework shown on several of the host OSs. However, it is preferred that the SysResource framework and various utilities are present in each OS to ease access to the framework. Further, in the preferred embodiment the LCs have two connections to the chassis backplane, so the OEM tools to monitor the backplane are aware of this configuration, but the MM has only a single connection, so using the rsh technique from an MM to an LC would require the MM CPUIF utility, for example, to also understand the dual connection environment of the LCs. By having the SysResource framework and utilities on the LC and the administrator connecting to that framework, the CPUIF utility can be simplified on the MM and the like.

The CPUIF statistics utility is also integrated with the NOS CLI backend to display MM CPU ioG backplane interface statistics.

SysResource Framework Use Case 2 (Cpu-Process-Usage Utility)

A cpu-process-usage utility is implemented using a Python script by using an OS tool like ps, top and /proc/ interface to collect various information such as CPU utilization of all CPU cores or each process memory, heap and stack utilization.

The cpu-process-usage utility can be used in standalone mode and in library mode to redirect the output to an application DCM backend to display the statistics with the NOS CLI.

The cpu-process-usage utility is installed on each MM and LC card in chassis-based systems, so by using the MM/LC slot option in the command, the command internally establishes remote connection with other MM/LC cards using rsh as described above. With this capability, from a single MM/LC card it is possible to collect all chassis MM and LC card statistics.

SysResource Framework Use Case 3 (Mem-Storage-Usage Utility)

A mem-storage-usage utility is implemented using a Python script by using OS /proc/file system and free tools to get system free and used memory status.

Syntax Examples cat/proc/slabinfo—Kernel low memory cache usage
cat/proc/vmalloc—Kernel vmalloc address space usage
cat/proc/meminfo
free -lm—Cross verify the low and vmalloc space.

The OS df and du tools can be used to collect check total disk space usage and disk space usage for each partition.

The mem-storage-usage utility can be used in standalone mode and in library mode to redirect the output to an application DCM backend to display the statistics with the NOS CLI.

The mem-storage-usage utility is installed on each MM and LC card in a chassis-based system so by using the MM/LC slot option in the command, the command internally establishes remote connection with other MM/LC cards using rsh as discussed above. With this capability, from a single MM/LC card we can collect all chassis MM and LC cards statistics.

By providing the SysReference Framework as an abstraction layer, simplified commands can be used to gather statistics from the various sources in the device, whether available to the OS where the command is being performed or another OS on a different card. As the framework is written in a scripting language and standard tools available for the OS, both OS tools and manufacturer tools, are utilized, greatly reduced efforts are needed to port the framework between different devices, as compared to the prior art C language constructs. The architecture allows simple extension to different OSs on different boards, while maintaining the same commands for all cases.

While the above preferred embodiments have been described with respect to a networking switch, it is understood that the invention can be applied to other devices, especially devices having a number of OS instances executing on various entities in the device.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A device comprising:
 at least two cards, each card having one or more processors and memory associated with the processors, the processors on each card interconnected to allow communication and the memory storing programs executed by the processors;
 a host operating system stored in a respective memory executing on each processor, wherein each host operating system includes host utilities to obtain system statistics for various entities;
 a host system resource framework stored in a respective memory executing on each host operating system, the host system resource framework coupled to the host utilities of the host operating system on which the host system resource framework is executing to allow access to the system statistics available from that host operating system, the host system resource framework formed in a scripting language code to receive statistics requests and to communicate with the host utilities;
 a guest application stored in a respective memory operating on each processor;
 a guest system resource framework stored in a respective memory executing on each guest application, wherein each guest application includes a guest operating system, the guest operating system including guest utilities to obtain statistics, wherein the host system resource framework on the host operating system accesses the guest system resource framework on the guest operating system by using a remote shell command to allow access from the host operating system and forwarding received commands to collect all desired system statistics in the device, wherein the device is a chassis-based device, wherein each guest application includes guest utilities to obtain system statistics for various entities; and wherein the guest system resource framework is coupled to the guest utilities of the guest application on which the guest system resource framework is executing to allow access to the system statistics available from that guest application, the guest system resource framework being formed in a scripting language code to receive statistics requests and to communicate with the guest utilities.

2. The device of claim 1, wherein each guest application is a virtual machine including a guest operating system and a device card application, and wherein each guest operating system includes guest utilities to obtain system statistics for various entities and such guest utilities are the guest utilities of the guest application.

3. The device of claim 1, wherein the host system resource framework operates in a command mode and a batch mode.

4. The device of claim 1, wherein the device is a network switch, wherein at least one card is a network interface card, and wherein at least one card is a switch card.

5. The device of claim 1, wherein a host system resource framework on one host operating system can access the host system resource framework on another host operating system by using a remote shell command to allow access from a single host operating system and forwarding received commands to collect all desired statistics in the device.

6. A method comprising:

executing, on each of at least two cards of a device, each card having one or more processors, the processors on each card interconnected to allow communication, a host operating system, wherein each host operating system includes host utilities to obtain system statistics for various entities;

executing, on each host operating system, a host system resource framework, the host system resource framework coupled to the host utilities of the host operating system on which the host system resource framework is executing to allow access to the system statistics available from that host operating system, the host system resource framework formed in a scripting language code to receive statistics requests and to communicate with the host utilities;

executing, on each card, a guest application;

executing, on each guest application, a guest system resource framework, wherein each guest application includes a guest operating system, the guest operating system including guest utilities to obtain statistics;

wherein the host system resource framework on the host operating system accesses the guest system resource framework on the guest operating system by using a remote shell command to allow access from the host operating system and forwarding received commands to collect all desired system statistics in the device, wherein the device is a chassis-based device;

wherein each guest application includes guest utilities to obtain system statistics for various entities; and wherein the guest system resource framework is coupled to the guest utilities of the guest application on which the guest system resource framework is executing to allow access to the system statistics available from that guest application, the guest system resource framework being formed in a scripting language code to receive statistics requests and to communicate with the guest utilities.

7. The method of claim 6, wherein each guest application is a virtual machine including a guest operating system and a device card application, and wherein each guest operating system includes guest utilities to obtain system statistics for various entities and such guest utilities are the guest utilities of the guest application.

8. The method of claim 6, wherein the host system resource framework operates in a command mode and a batch mode.

9. The method of claim 6, wherein the device a network switch, wherein at least one card is a network interface card, and wherein at least one card is a switch card.

10. The method of claim 6, wherein a host system resource framework on one host operating system can access the host system resource framework on another host operating system by using a remote shell command to allow access from a single host operating system and forwarding received commands to collect all desired statistics in the device.

* * * * *